Nov. 11, 1947.  F. G. DODGE  2,430,496
HEATED CUTTER FOR PLASTICS
Filed April 11, 1944
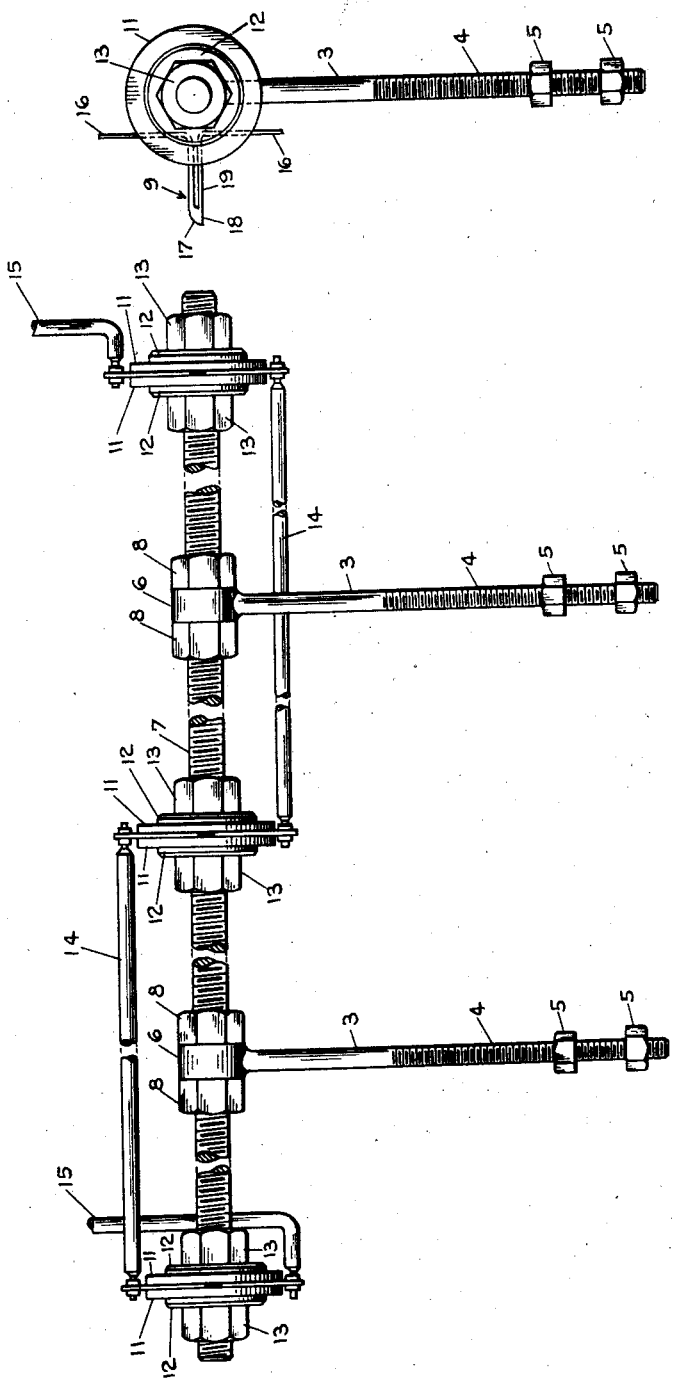
INVENTOR.
FREDERICK G. DODGE.
BY
ATTORNEYS Patented Nov. 11, 1947

2,430,496

UNITED STATES PATENT OFFICE 2,430,496

HEATED CUTTER FOR PLASTICS

Frederick G. Dodge, La Vale, Md., assignor to Celanese Corporation of America, a corporation of Delaware Application April 11, 1944, Serial No. 530,575

2 Claims. (Cl. 219—19)

This invention relates to web cutting devices, and relates more particularly to improved cutting means for dividing into narrower widths or ribbons webs having a basis of a thermoplastic material, especially woven fabric webs made of or containing threads, yarns or filaments having a basis of a thermoplastic material.

In the cutting of a web of fabric made of or containing threads, yarns or filaments having a basis of a thermoplastic material, into narrower widths or ribbons, it has been found that the use of heated cutting elements or knives yields highly satisfactory results. Heated cutting elements not only act to sever the fabric web but also to seal simultaneously with the severing the severed edges by softening or melting the threads, yarns or filaments of thermoplastic material. Thus, heated cutting elements are eminently suitable for severing webs having a basis of cellulose acetate or other organic derivative of cellulose, such as cellulose propionate and cellulose butyrate, ethyl cellulose and benzyl cellulose, as well as webs having a basis of condensation products of cellulose and glycols or other polyhydric alcohols, or a basis of synthetic linear polyamide condensation products, such as polyamides derived from amino acids or from the condensation products of diamines with carboxylic acid, e. g. polyhexamethylene adipamide. The web may be composed entirely of one of the above thermoplastic compounds or of a mixture of two or more of such compounds. Moreover, the heated cutting elements satisfactorily sever webs of mixed fabric containing threads, yarns or filaments of a thermoplastic material together with fibers of vegetable or animal sources such as, for example, natural silk, cotton, wool, linen, as well as synthetic non-thermoplastic cellulosic threads, yarns or filaments.

It is an object of this invention to provide a novel and improved means employing heated cutting elements for severing into narrower widths or ribbons webs having a basis of a thermoplastic material.

Another object of this invention is the provision of a cutting mechanism, employing heated cutting elements, which may be readily attached to any suitable device for forwarding or feeding a web.

A further object of this invention is a provision of a novel heated cutting element suitable for use in a cutting mechanism for severing webs of a thermoplastic material.

Other objects of this invention, together with certain details of construction and combinations of parts, will appear from the following description and accompanying drawing.

In the drawing, wherein a preferred embodiment of my invention is shown,

Figure 1 is an elevational view of the cutting mechanism of this invention, showing a plurality of cutting elements arranged in series, and Figure 2 is an end view of the cutting mechanism showing the novel cutting element in greater detail.

Like reference numerals indicate like parts throughout both views of the drawing.

Referring now to the drawing for a detailed description of the present invention, there are shown supporting rods 3 each having at one end a threaded portion 4 on which are threaded nuts 5 to be employed for attaching the rods to a crossbar of a suitable forwarding or feeding device (not shown). The other end of said supporting rods 3 have welded thereto or integral therewith looped portions 6 through which is passed a threaded rod 7, which rod is held against longitudinal movement and against turning by means of nuts 8. The threaded rod 7 is adapted to support in any desired position one or more cutting elements generally indicated by reference numeral 9 made in a special manner as will be described below. The number of cutting elements employed will, of course, depend on the number of narrower widths into which it is desired to divide the web.

As shown in the drawing, three cutting elements are mounted on threaded rod 7, the cutting elements being held in position by means of fiber discs 11, washers 12 and nuts 13. These cutting elements are connected in series by means of bus bars or resistance elements 14, the current being supplied through any low voltage transformer (not shown) through suitable connections 15.

The cutting elements are made by bending a wire in the form of a loop with the free ends 16 bent at right angles to the portion forming said loop, the looped portion being flattened. The bottom of the flattened loop portion is curved as shown at 17 and at least the lower portion 18 of the straight edge 19 is brought to a sharp or cutting edge.

In practice, it is desirable that the cutting elements be heated to the same temperature. This may be effected by adjusting the length of the resistance elements between the cutting elements or by filing the cutting surface of the cutting elements, preferably while hot in order that they may be of the same temperature.

The cutting elements are made from "Ohmax,"

"Radiohm," "Nichrome," nickel steel or other suitable high electric resistance metals.

It is to be understood that the foregoing detailed description is given merely by way of illustration and that many variations may be made therein without departing from the spirit of my invention.

Having described my invention, what I desire to secure by Letters Patent is:

1. In a device for severing a web containing thermoplastic material, a threaded rod, a plurality of cutting elements spaced along said rod, each of said cutting elements comprising a wire, a portion of said wire being bent into the form of a loop and flattened and the remaining portion being bent at right angles to the sides of said loop so as to form free ends, means for holding said cutting elements in adjustable position on said rod, and bus bars for electrically connecting said free ends of said cutting elements in series for the heating thereof.

2. In a device for severing a web containing thermoplastic material, a threaded rod, a plurality of cutting elements spaced along said rod, each of said cutting elements comprising a wire, a portion of said wire being bent into the form of a loop and flattened and the remaining portion being bent at right angles to the sides of said loop so as to form free ends, means for holding said cutting elements in adjustable position on said rod, bus bars for electrically connecting said free ends of said cutting elements in series for the heating thereof, and means adjustable along said rod for supporting said rod and said cutting elements.

FREDERICK G. DODGE.

REFERENCES CITED

The following references are of record in the file of this patent:

UNITED STATES PATENTS

| Number | Name | Date |
| --- | --- | --- |
| 300,155 | Starr | June 10, 1884 |
| 2,012,938 | Beuoy | Sept. 3, 1935 |
| 1,834,555 | Tittle | Dec. 1, 1931 |
| 1,445,992 | Cameron | Feb. 20, 1923 |
| 807,521 | Walker | Dec. 19, 1905 |
| 2,252,334 | Schwimmer | Aug. 12, 1941 |
| 2,255,718 | Van Vorst | Sept. 9, 1941 |
| 2,310,844 | Draeger | Feb. 9, 1943 |